(12) United States Patent
Prentice et al.

(10) Patent No.: US 9,014,388 B2
(45) Date of Patent: Apr. 21, 2015

(54) ENABLE AND DISABLE COMPARATOR VOLTAGE REFERENCE

(75) Inventors: Seth M. Prentice, Auburn, ME (US); Julie Lynn Stultz, Scarborough, ME (US)

(73) Assignee: Fairchild Semiconductor Corporation, San Jose, CA (US)

( * ) Notice: Subject to any disclaimer, the term of this patent is extended or adjusted under 35 U.S.C. 154(b) by 526 days.

(21) Appl. No.: 13/302,644

(22) Filed: Nov. 22, 2011

(65) Prior Publication Data

US 2012/0134516 A1    May 31, 2012

Related U.S. Application Data

(60) Provisional application No. 61/416,245, filed on Nov. 22, 2010.

(51) Int. Cl.
*H04R 1/10* (2006.01)
*H04M 1/725* (2006.01)
*H02B 1/00* (2006.01)
(Continued)

(52) U.S. Cl.
CPC ............ *H04M 1/72527* (2013.01); *H04R 5/04* (2013.01); *H04M 1/6058* (2013.01); *H04M 1/05* (2013.01)

(58) Field of Classification Search
CPC .... H04R 5/04; H04R 1/1041; H04R 2420/05; H04R 5/033; H01R 13/7031; H01R 2105/00; H04M 1/6058; H04M 1/05
USPC ....................... 381/77–85, 123, 94.1, 384, 74; 307/116; 439/489; 455/569.1, 556.1, 455/557, 575.1
See application file for complete search history.

(56) References Cited

U.S. PATENT DOCUMENTS

| | | | |
|---|---|---|---|
| 2004/0100275 | A1 | 5/2004 | Shin |
| 2005/0201568 | A1* | 9/2005 | Goyal ............................ 381/74 |
| 2009/0180354 | A1* | 7/2009 | Sander et al. ................. 367/197 |

FOREIGN PATENT DOCUMENTS

| | | |
|---|---|---|
| CN | 1304215 A | 7/2001 |
| CN | 1866757 A | 11/2006 |

(Continued)

OTHER PUBLICATIONS

"Chinese Application Serial No. 201110409016.4, Office Action mailed Apr. 29, 2014", w/English Translation, 16 pgs.

(Continued)

*Primary Examiner* — Vivian Chin
*Assistant Examiner* — Ammar Hamid
(74) *Attorney, Agent, or Firm* — Schwegman Lundberg & Woessner, P.A.

(57) ABSTRACT

This document discusses, among other things, systems and methods to reduce power use of an accessory detection device. The accessory detection device can be configured to be coupled to a mobile device having an audio jack configured to be coupled to a mobile device accessory having a send/end key. In an example, the accessory detection device can include a comparator and a switch. The comparator can be configured to receive mobile device accessory information from the mobile device accessory and to determine activation of the send/end key using the received mobile device accessory information. The switch can be configured to receive connection information indicative of mobile device accessory connection to the audio jack and to isolate a reference input of the comparator from a supply voltage using the connection information, for example, to reduce leakage current.

20 Claims, 4 Drawing Sheets

(51) Int. Cl.
*H04R 5/04* (2006.01)
*H04M 1/60* (2006.01)
*H04M 1/05* (2006.01)

(56) References Cited

FOREIGN PATENT DOCUMENTS

| CN | 101197557 A | 6/2008 |
|---|---|---|
| CN | 101489159 A | 7/2009 |
| CN | 101493490 A | 7/2009 |
| CN | 201509235 U | 6/2010 |
| CN | 102595299 A | 7/2012 |
| CN | 202364377 U | 8/2012 |
| EP | 0999721 A2 | 5/2000 |
| JP | 2005261141 A | 9/2005 |
| KR | 1020120055473 A | 5/2012 |

OTHER PUBLICATIONS

"Chinese Application Serial No. 201110409016.4, Office Action mailed Nov. 1, 2013", w/English Translation, 13 pgs.

"Chinese Application Serial No. 201110409016.4, Response filed Mar. 14, 2014 to Office Action mailed Nov. 1, 2013", w/English Claims, 8 pgs.

\* cited by examiner

ENABLE AND DISABLE COMPARATOR VOLTAGE REFERENCE

CLAIM OF PRIORITY

This application claims the benefit of priority under 35 U.S.C. §119(e) of Seth M. Prentice et al. U.S. Provisional Patent Application Ser. No. 61/416,245, entitled "ENABLE AND DISABLE COMPARATOR VOLTAGE REFERENCE," filed on Nov. 22, 2010, which is incorporated by reference herein in its entirety.

BACKGROUND

Mobile devices (e.g., mobile phones, etc.) can include various accessories. For example, mobile devices with audio jacks can be configured to be coupled to a headset having at least one of a headphone, a speaker, a microphone, or a send/end key. In an example, the mobile device can include a comparator configured to identify when the send/end key is activated on the headset. In certain examples, activating the send/end key can reduce the microphone bias to ground or increase the microphone bias to a full microphone bias voltage level. In an example, a voltage divider can be used to set the comparator threshold level to identify the send/end key activation. In many devices, the resistors used for the voltage divider are connected to a supply that is normally enabled, even if the headset is not connected, creating excess current draw.

OVERVIEW

This document discusses, among other things, systems and methods to reduce power use of an accessory detection device. The accessory detection device can be configured to be coupled to a mobile device having an audio jack configured to be coupled to a mobile device accessory having a send/end key. In an example, the accessory detection device can include a comparator and a switch. The comparator can be configured to receive mobile device accessory information from the mobile device accessory and to determine activation of the send/end key using the received mobile device accessory information. The switch can be configured to receive connection information indicative of mobile device accessory connection to the audio jack and to isolate a reference input of the comparator from a supply voltage using the connection information, for example, to reduce leakage current.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventors have recognized, among other things, systems and methods to detect connection of one or more mobile device accessories to a mobile device, for example, to an audio jack of the mobile device or one or more other inputs or outputs. In an example, an accessory detection device (e.g., a circuit configured to be placed inside of the mobile device) can include a comparator and a microphone switch with an external voltage reference pin. In an example, the accessory detection device can include enable/disable circuitry that can recognize when the voltage reference is or is not required. When the voltage reference is not required, a switch can isolate the detection device from a supply voltage, in certain examples eliminating excess leakage current and increasing the battery life of the mobile device. In an example, integrating a standard PMOS gate to isolate the detection device from the supply voltage can introduce electrostatic discharge (ESD) concerns. Accordingly, in certain examples, the detection device can include a customized PMOS cell configured to increase ESD robustness while maintaining functionality.

Figure 1:
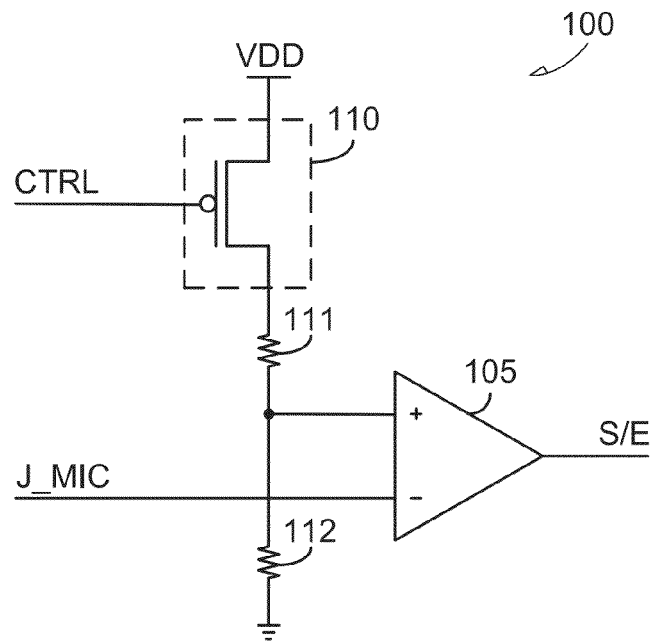
FIG. 1 illustrates generally an example of a system including an accessory detection device.

FIG. 1 illustrates generally an example of a system 100 including a comparator 105, a switch 110, and a resistor divider including first and second resistors 111, 112. In an example, the comparator 105 can be configured to receive a reference voltage at a reference input (+) and mobile device accessory information, such as information from a microphone pin of a mobile device accessory (e.g., a headset, etc.), at a microphone input (J_MIC), to compare the mobile device accessory information to the reference voltage and to provide an indication of a send/end key activation using the comparison (e.g., using a send/end key (S/E) output).

In an example, the switch 110 can be configured to receive connection information indicative of mobile device accessory connection to the audio jack, for example, at a control input (CTRL) and to isolate a reference input of the comparator from a supply voltage (VDD) using the connection information. In an example, the switch 110 can include a metal-oxide field-effect transistor (MOSFET), such as a p-type MOSFET (PMOS) device, and in certain examples, as described below, the PMOS or other device can include an ESD PMOS device configured to alleviate ESD concerns found in typical PMOS devices.

Figure 2:
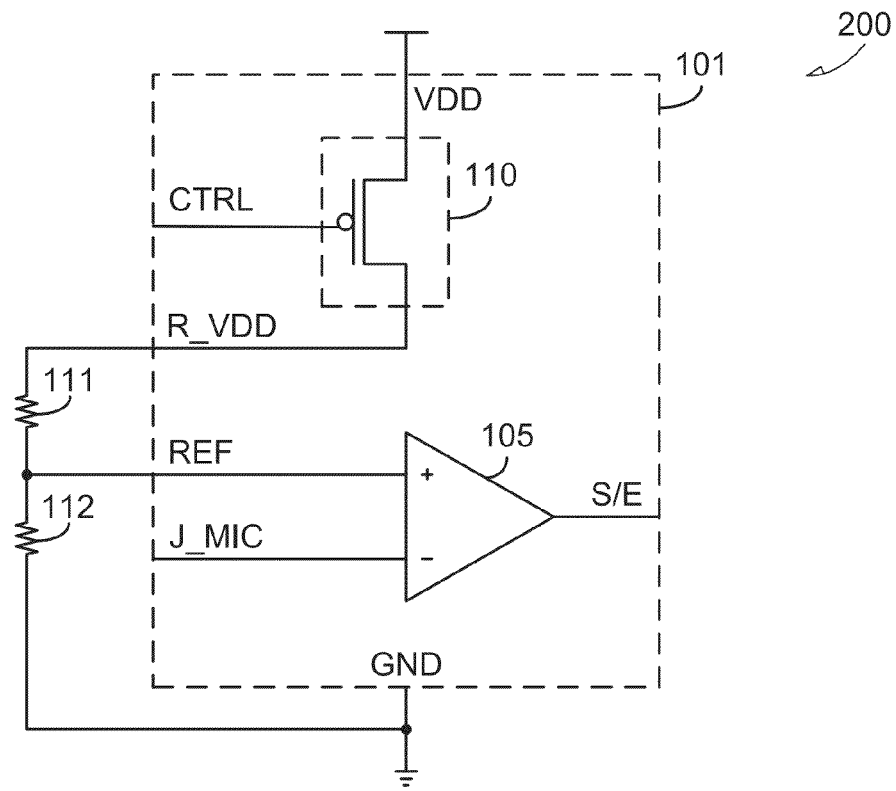
FIG. 2 illustrates generally an example of a system including an accessory detection device and an external resistor divider.

FIG. 2 illustrates generally an example of a system 200 including an accessory detection device 101 and an external resistor divider including first and second resistors 111, 112. In an example, the detection device 101 can include a comparator 105 and a switch 110. In an example, the switch 110 can include a PMOS device or other switch configured to isolate a supply voltage (VDD) from the external resistor divider and the comparator 105. In an example, an integrated circuit (IC) can include the detection device 101 and not the external resistor divider, such as to allow a determinable reference voltage at a reference input (REF) of the comparator using the first and second resistors 111, 112.

Figure 3:
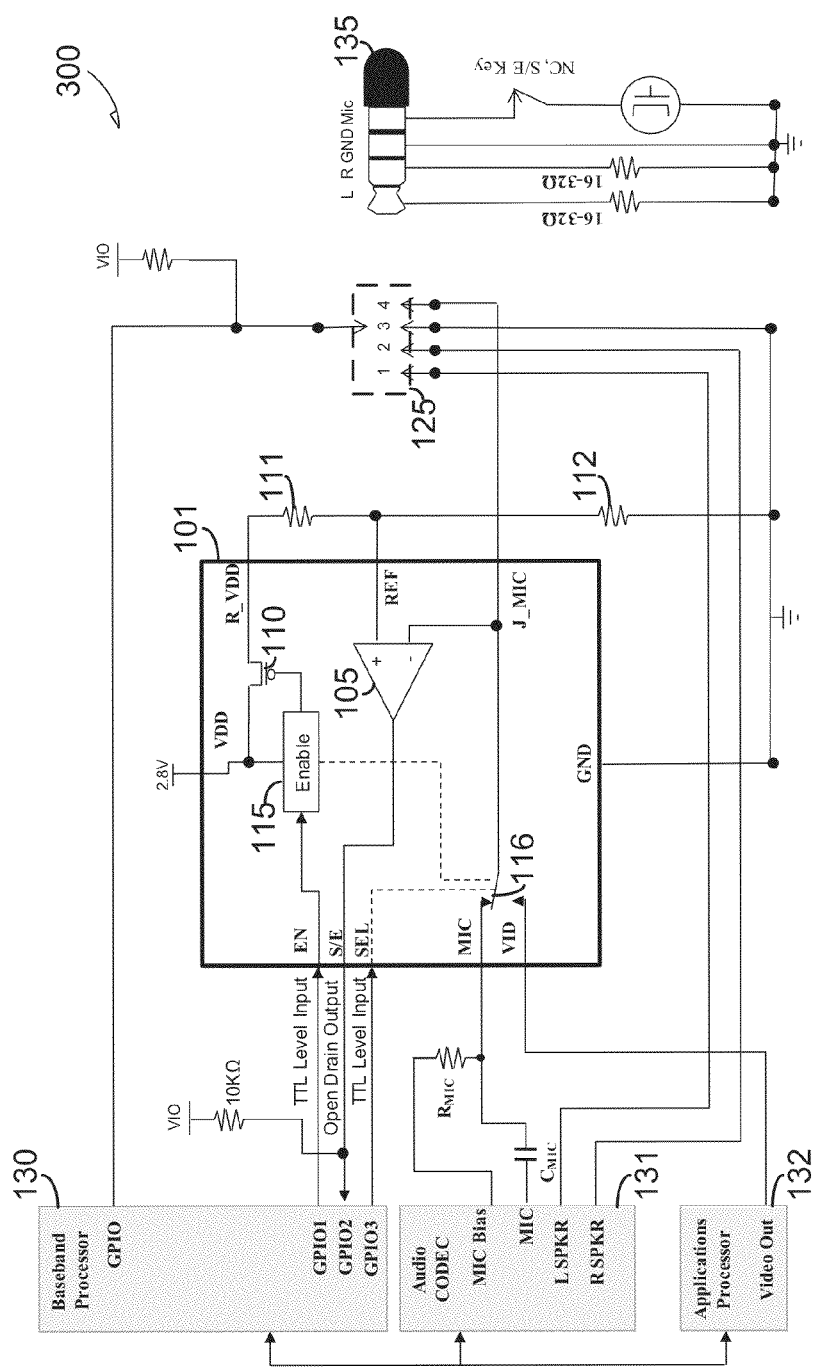
FIG. 3 illustrates generally an example of a system including an accessory detection device, a baseband processor, an audio codec, applications processor, and an audio jack.

FIG. 3 illustrates generally an example of a system 300 including an accessory detection device 101, a baseband processor 130, an audio codec 131, an applications processor 132, and an audio jack 125.

In an example, the audio jack 125 can include four terminals, such as: (1) left audio (L); (2) right audio (R); (3) ground (GND); and (4) a data terminal. In an example, the data terminal can be configured to receive mobile device accessory information, such as a microphone input (Mic). In other examples, the data terminal can be configured to receive or provide other accessory information, such as providing video data out, etc.

In certain examples, the audio jack 125 can be configured to receive an audio plug 135, such as a 4-pole audio plug. In other examples, the audio jack 125 can be configured to receive one or more other types of audio plugs, or the audio jack 125 and audio plug 135 can be replaced with one or more other type of input/output (IO).

In an example, when a headset is plugged into the audio jack 125, a baseband processor 130 can enable the detection device 101, for example, using an enable input (EN) and an enable circuit 115, and can close a microphone switch 116, connecting a microphone pin (MIC) to a microphone input (J_MIC), such as by using a select (SEL) input, which can enable the detection device 101 to provide a voltage reference at a reference supply voltage (R_VDD) for the comparator 105, such as through an external resistor divider (e.g., the first and second resistors 111, 112) configured to provide a determinable (e.g., user determinable, etc.) reference voltage to the comparator 105.

In the example of FIG. 3, a microphone line between the audio codec 131 and the detection device 101 can be pulled to a microphone bias (MIC_Bias) level through a microphone resistor ($R_{MIC}$, e.g., typically 2.2 kΩ). In an example, a headset microphone (e.g., a JFET type microphone, etc.) can represent a load of ~2 kΩ, creating a microphone bias level of ~MIC_Bias/2. In an example, if a send/end (S/E) key is activated (e.g., pushed) on the headset, the connection to the microphone can be open allowing the microphone bias to increase to or near the full microphone bias voltage potential. The microphone bias can pass the reference voltage on the comparator 105 and the send/enable (S/E) output pin on the detection device 101 can be updated, communicating an S/E key activation to the baseband processor 130.

In an example, the circuitry (e.g., the switch 110) and the reference voltage (REF) on the comparator 105 can be required only when a headset is plugged in. If a video switch (VID) is selected, for example, from an applications processor 132, or the detection device 101 is disabled, the reference supply voltage (R_VDD) can be disabled using the switch 110, eliminating excess current through the external resistor divider (e.g., the first and second resistors 111, 112), etc.

Figure 4:
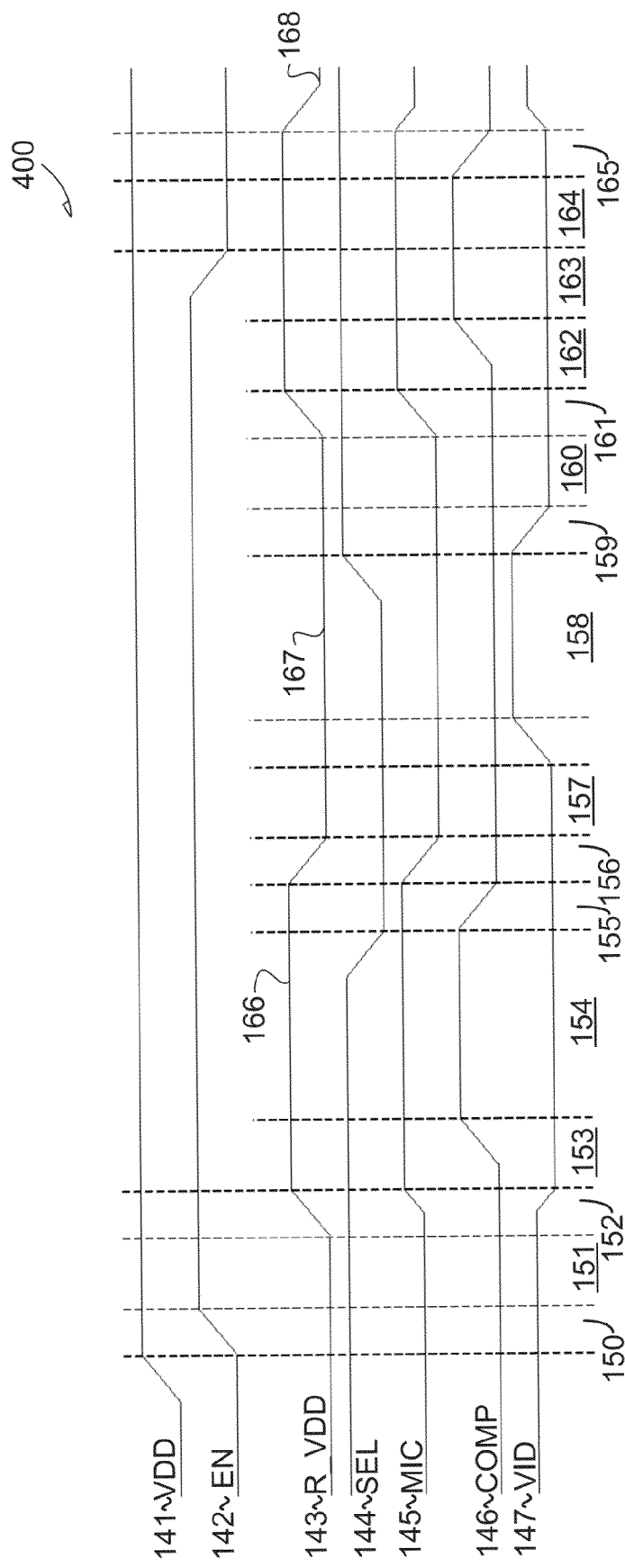
FIG. 4 illustrates generally an example of a logic diagram for an accessory detection device.

FIG. 4 illustrates generally an example of a timing diagram 400 of a detection device, such as that illustrated in the example of FIG. 3, disclosing an example relationship between a supply voltage (VDD) 141, an enable signal (EN) 142, a reference supply voltage (R_VDD) 143, a select signal (SEL) 144, a microphone signal (MIC) 145, a comparator output (COMP) 146, and a video enable signal (VID) 147 with reference to time. In an example, at 166, the detection device can be enabled and the MIC switch can be selected. In an example, at 167, the detection device can be enabled, and the VII) switch can be selected. In an example, at 168, the detection device can be disabled. Table 1, below, provides an example operation.

TABLE 1

| EN | SEL | MIC | VID | R_VDD | S/E |
|----|-----|---------|---------|-------|--------|
| 0  | X   | 3-State | 3-State | GND   | H      |
| 1  | 1   | J_MIC   | Open    | VDD   | Active |
| 1  | 0   | Open    | J_MIC   | GND   | H      |

Figure 5:
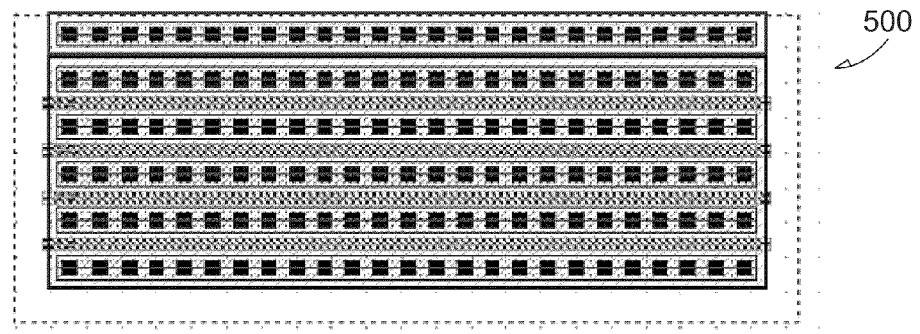
FIG. 5 illustrates generally an example of a standard PMOS device.

FIG. 5 illustrates generally an example of a standard PMOS device 500.

Figure 6:
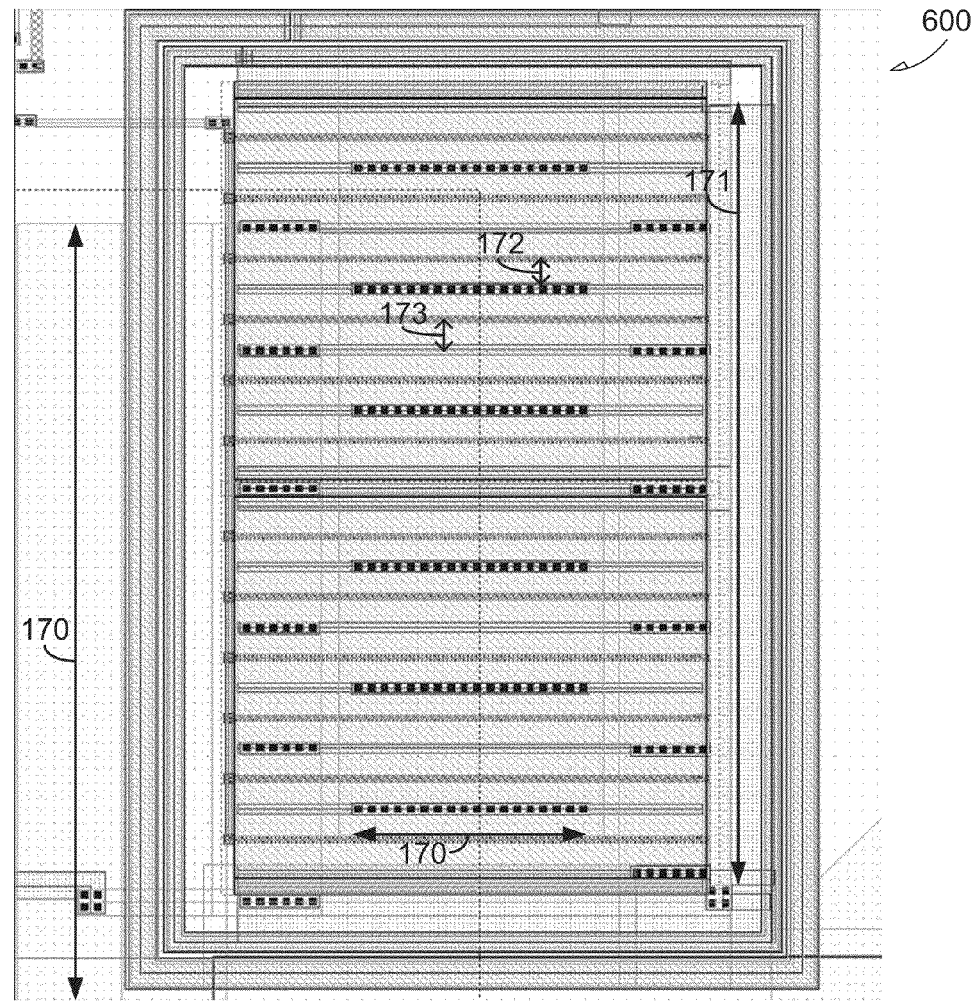
FIG. 6 illustrates generally an example of a PMOS device designed for electrostatic discharge (ESD) robustness.

FIG. 6 illustrates generally an example of a p-type metal-oxide field-effect transistor (PMOS) device 600 designed for electrostatic discharge (ESD) robustness. The PMOS device 600 between the supply voltage (VDD) and a reference supply voltage (R_VDD) can provide ESD robustness while still meeting application requirements (e.g., for the example illustrated in FIG. 3). In an example, the PMOS device 600 includes increased source metal 170 and increased drain metal 171 in comparison to the standard PMOS device 500 of FIG. 5. In certain examples, the channel lengths and widths are increased with respect to the example illustrated in FIG. 5. Further, the number of stripes has increased, as well as the source contact to gate spacing (SCGS) 172 and the drain contact to gate spacing (DCGS) 173, greatly increasing the current density in the PMOS device 500. Table 2 illustrates example changes for each of the parameters referenced above.

TABLE 2

| Parameter | Standard PMOS | ESD PMOS |
|-----------|---------------|----------|
| Channel Length | 0.35 um | 0.50 um |
| Channel Width | 80 um | 400 um |
| Number of Stripes | 4 | 12 |
| SCGS/DCGS Spacing | 0.30 um | 1.80 um |
| Current Density | 6.40 ma | 57.0 mA |

Although certain examples above are illustrated with respect to a mobile device, an audio jack, and a headset, the subject matter disclosed herein is likewise applicable to any comparator configured to compare a received signal to a reference voltage supplied using a supply voltage. In an example, the supply voltage can be isolated or coupled to the comparator using information about the received signal, or using information about a device providing the received signal.

Additional Notes

In Example 1, a system includes an accessory detection device configured to be coupled to a mobile device having an audio jack, wherein the audio jack is configured to be coupled to a mobile device accessory having a send/end key. The accessory detection device can include a comparator configured to receive mobile device accessory information from the mobile device accessory and to determine activation of the send/end key using the received mobile device accessory information and a switch configured to receive connection information indicative of a mobile device accessory connection to the audio jack and to isolate a reference input of the comparator from a supply voltage using the connection information.

In Example 2, Example 1 can optionally include the audio jack, wherein the audio jack includes a 4-pole audio jack configured to receive a 4-pole audio plug, the 4-pole audio jack including left audio terminal, a right audio terminal, a ground terminal, and a data terminal, wherein the switch is optionally configured to receive connection information using the ground terminal of the 4-pole audio jack, and wherein the connection information is optionally different than the mobile device accessory information.

In Example 3, the comparator of any one or more of Examples 1-2 is optionally configured to receive mobile device accessory information using the data terminal.

In Example 4, the switch of any one or more of Examples 1-3 is optionally configured to isolate the reference input of the comparator from the supply voltage response to the connection information indicating that the mobile device accessory is not coupled to the audio jack.

In Example 5, the switch of any one or more of Examples 1-4 is optionally configured to couple the reference input of the comparator to the supply voltage in response to the connection information indicating that the mobile device accessory is coupled to the audio jack.

In Example 6, any one or more of Examples 1-5 optionally includes a resistor divider configured to receive a voltage from the switch and to provide a reference voltage to the reference input of the comparator.

In Example 7, any one or more of Examples 1-6 optionally includes an integrated circuit (IC) including the comparator and the switch, and the comparator of any one or more of Examples 1-6 is optionally configured to receive a determinable reference voltage at the reference input using an external resistor divider and the switch.

In Example 8, any one or more of Examples 1-7 optionally includes the external resistor divider, including first and second resistors having first and second resistance values, wherein the of any one or more of Examples 1-7 optionally includes a switch output and a reference input, wherein the first resistor of any one or more of Examples 1-7 is optionally coupled between the switch output and the reference input, wherein the second resistor of any one or more of Examples 1-7 is optionally coupled between the reference input and a voltage level, and wherein the switch of any one or more of Examples 1-7 is optionally configured to selectively provide the supply voltage to the external resistor divider to provide the determinable reference voltage to the reference input of the comparator as a function of the first and second resistance values and the supply voltage.

In Example 9, the mobile device accessory of any one or more of Examples 1-8 optionally includes at least one of a 4-pole mobile device headset having a send/end key or a 4-pole audio/video interface configured to provide audio or video output from the mobile device to an external display.

In Example 10, the switch of any one or more of Examples 1-9 optionally includes a metal-oxide-semiconductor field-effect transistor (MOSFET).

In Example 11, the switch of any one or more of Examples 1-10 optionally includes a p-channel MOSFET (PMOS) device.

In Example 12, the PMOS device of any one or more of Examples 1-11 optionally includes an electrostatic-discharge (ESD) PMOS device having a channel width at least 500 times greater than a channel length and a source-contact to gate spacing and a drain-contact to gate spacing at least 3 times greater than the channel length to provide a desired current density and ESD robustness.

In Example 13, any one or more of Examples 1-12 can include receiving connection information indicative of mobile device accessory connection to an audio jack of a mobile device, receiving mobile device accessory information, different from the connection information, from the mobile device accessory at a comparator, determining activation of a send/end key of the mobile device accessory using the comparator and the mobile device accessory information, and isolating a reference input of the comparator from a supply voltage using the connection information and a switch.

In Example 14, the receiving connection information of any one or more of Examples 1-13 optionally includes receiving connection information from a ground terminal of a 4-pole audio jack configured to receive a 4-pole audio plug of the mobile device accessory.

In Example 15, the isolating the reference input of the comparator of any one or more of Examples 1-14 optionally includes in response to the connection information indicating that the mobile device accessory is not coupled to the audio jack.

In Example 16, any one or more of Examples 1-15 optionally includes coupling the reference input of the comparator to the supply voltage in response to the connection information indicating that the mobile device accessory is coupled to the audio jack.

In Example 17, any one or more of Examples 1-16 optionally includes selectively providing a determinable reference voltage to the reference input of the comparator using a resistor divider coupled to the switch, the resistor divider optionally including first and second resistors having first and second resistance values, the reference voltage determinable as a function of the first and second resistance values.

In Example 18, the isolating the reference input of the comparator of any one or more of Examples 1-17 using the switch optionally includes using a metal-oxide-semiconductor field-effect transistor (MOSFET).

In Example 19, the isolating the reference input of the comparator using the MOSFET of any one or more of Examples 1-18 optionally includes using a p-channel MOSFET (PMOS) device.

In Example 20, the isolating the reference input of the comparator using the PMOS device of any one or more of Examples 1-19 optionally includes using an electrostatic-discharge (ESD) PMOS device having a channel width at least 500 times greater than a channel length and a source-contact to gate spacing and a drain-contact to gate spacing at least 3 times greater than the channel length to provide a desired current density and ESD robustness. In other examples, one or more other ranges can be provided to provide a desired current density and ESD robustness, with space and cost tradeoffs.

In Example 21, a system or apparatus can include, or can optionally be combined with any portion or combination of any portions of any one or more of Examples 1-20 to include, means for performing any one or more of the functions of Examples 1-20, or a machine-readable medium including instructions that, when performed by a machine, cause the machine to perform any one or more of the functions of Examples 1-20.

The above detailed description includes references to the accompanying drawings, which form apart of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, although the examples above have been described relating to p-type devices, one or more examples can be applicable to n-type devices. In other examples, the above-described examples or one or more aspects thereof) may be used in combination with each other. Other embodiments can be used, such as by one of ordinary skill in the art upon reviewing the above description. The Abstract is provided to comply with 37 CFR, §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A system comprising:
    an accessory detection device configured to be coupled to a mobile device having an audio jack, wherein the audio jack is configured to be coupled to a mobile device accessory having a send/end key, the accessory detection device including:
        a comparator configured to receive mobile device accessory information from the mobile device accessory and to determine activation of the send/end key using the received mobile device accessory information; and
        a switch configured to receive connection information indicative of a mobile device accessory connection to the audio jack and to isolate a reference input of the comparator from all supply voltage using the connection information.

2. The system of claim 1, including the audio jack, wherein the audio jack includes a 4-pole audio jack configured to receive a 4-pole audio plug, the 4-pole audio jack including left audio terminal, a right audio terminal, a ground terminal, and a data terminal;
    wherein the switch is configured to receive connection information using the ground terminal of the 4-pole audio jack; and
    wherein the connection information is different than the mobile device accessory information.

3. The system of claim 2, wherein the comparator is configured to receive mobile device accessory information using the data terminal.

4. The system of claim 1, wherein the switch is configured to isolate the reference input of the comparator from the supply voltage in response to the connection information indicating that the mobile device accessory is not coupled to the audio jack.

5. The system of claim 1, wherein the switch is configured to couple the reference input of the comparator to the supply voltage in response to the connection information indicating that the mobile device accessory is coupled to the audio jack.

6. The system of claim 1, including a resistor divider configured to receive a voltage from the switch and to provide a reference voltage to the reference input of the comparator.

7. The system of claim 1, including an integrated circuit (IC) including the comparator and the switch; and
    wherein the comparator is configured to receive a determinable reference voltage at the reference input using an external resistor divider and the switch.

8. The system of claim 7, including the external resistor divider, the external resistor divider including first and second resistors having first and second resistance values;
    wherein the IC includes a switch output and a reference input;
    wherein the first resistor is coupled between the switch output and the reference input, and wherein the second resistor is coupled between the reference input and a voltage level; and
    wherein the switch is configured to selectively provide the supply voltage to the external resistor divider to provide the determinable reference voltage to the reference input of the comparator as a function of the first and second resistance values and the supply voltage.

9. The system of claim 1, wherein the mobile device accessory includes at least one of a 4-pole mobile device headset having a send/end key or a 4-pole audio/video interface configured to provide audio or video output from the mobile device to an external display.

10. The system of claim 1, wherein the switch includes a metal-oxide-semiconductor field-effect transistor (MOSFET).

11. The system of claim 10, wherein the switch includes a p-channel MOSFET (PMOS) device.

12. The system of claim 11, wherein the PMOS device includes an electrostatic-discharge (ESD) PMOS device having a channel width at least 500 times greater than a channel length and a source-contact to gate spacing and a drain-contact to gate spacing at least 3 times greater than the channel length to provide a desired current density and ESD robustness.

13. A method comprising:
    receiving connection information indicative of mobile device accessory connection to an audio jack of a mobile device;
    receiving mobile device accessory information, different from the connection information, from the mobile device accessory at a comparator;
    determining activation of a send/end key of the mobile device accessory using the comparator and the mobile device accessory information; and
    isolating a reference input of the comparator from all supply voltage using the connection information and a switch.

14. The method of claim 13, wherein the receiving connection information includes receiving connection information from a ground terminal of a 4-pole audio jack configured to receive a 4-pole audio plug of the mobile device accessory.

15. The method of claim 13, wherein the isolating the reference input of the comparator includes in response to the connection information indicating that the mobile device accessory is not coupled to the audio jack.

16. The method of claim 13, including coupling the reference input of the comparator to the supply voltage in response to the connection information indicating that the mobile device accessory is coupled to the audio jack.

17. The method of claim 13, including selectively providing a determinable reference voltage to the reference input of the comparator using a resistor divider coupled to the switch, the resistor divider including first and second resistors having first and second resistance values, the reference voltage determinable as a function of the first and second resistance values.

18. The method of claim 13, wherein the isolating the reference input of the comparator using the switch includes using a metal-oxide-semiconductor field-effect transistor (MOSFET).

19. The method of claim 18, wherein the isolating the reference input of the comparator using the MOSFET includes using a p-channel MOSFET (PMOS) device.

20. The method of claim 19, wherein the isolating the reference input of the comparator using the PMOS device includes using an electrostatic-discharge (ESD) PMOS device having a channel width at least 500 times greater than a channel length and a source-contact to gate spacing and a drain-contact to gate spacing at least 3 times greater than the channel length to provide a desired current density and ESD robustness.

\* \* \* \* \*